United States Patent
Meyer et al.

(10) Patent No.: US 7,452,600 B2
(45) Date of Patent: Nov. 18, 2008

(54) SILICA

(75) Inventors: Jürgen Meyer, Stockstadt (DE); Stephanie Frahn, Goldbach (DE); Manfred Ettlinger, Karlstein (DE)

(73) Assignee: Degussa AG, Düsseldorf (DE)

( * ) Notice: Subject to any disclaimer, the term of this patent is extended or adjusted under 35 U.S.C. 154(b) by 73 days.

(21) Appl. No.: 10/524,472

(22) PCT Filed: Jul. 29, 2003

(86) PCT No.: PCT/EP03/08331

§ 371 (c)(1), (2), (4) Date: Feb. 11, 2005

(87) PCT Pub. No.: WO2004/020532

PCT Pub. Date: Mar. 11, 2004

(65) Prior Publication Data

US 2005/0244642 A1  Nov. 3, 2005

(30) Foreign Application Priority Data

Aug. 28, 2002 (DE) ................................ 102 39 423

(51) Int. Cl.
*B32B 5/16* (2006.01)
*B32B 19/00* (2006.01)
*B32B 27/02* (2006.01)
*B32B 27/40* (2006.01)

(52) U.S. Cl. ........................ 428/405; 428/331; 428/357; 428/403; 428/423.1; 428/425.8

(58) Field of Classification Search ....................... None
See application file for complete search history.

(56) References Cited

U.S. PATENT DOCUMENTS

| 4,015,031 | A | 3/1977 | Reinhardt et al. | |
|---|---|---|---|---|
| 5,665,156 | A | 9/1997 | Ettlinger et al. | |
| 5,959,005 | A | 9/1999 | Hartmann et al. | |
| 6,020,419 | A | 2/2000 | Bock et al. | |
| 6,193,795 | B1 * | 2/2001 | Nargiello et al. | 106/484 |
| 6,316,050 | B1 | 11/2001 | Troll et al. | |
| 2002/0037936 | A1 * | 3/2002 | Michael et al. | 516/111 |

FOREIGN PATENT DOCUMENTS

| EP | 0 637 616 A1 | 2/1995 |
|---|---|---|
| EP | 0 672 731 A1 | 9/1995 |
| WO | WO 01/64796 A1 | 9/2001 |

\* cited by examiner

*Primary Examiner*—Sheeba Ahmed
(74) *Attorney, Agent, or Firm*—Robert G. Weilacher; Smith, Gambrell & Russell

(57) ABSTRACT

Silanized, structurally modified, pyrogenically produced silicas, characterised by groups fixed to the surface, wherein the groups are dimethylsilyl and/or monomethylsilyl, are produced in that pyrogenically produced silica is treated by a known method with dimethyldichlorosilane and/or monomethyltrichlorosilane, the groups dimethylsilyl and/or monomethylsilyl being fixed on the surface of the pyrogenic silica, and is then structurally modified and optionally post-ground. They are used to improve scratch resistance in lacquers.

13 Claims, No Drawings

SILICA

INTRODUCTION AND BACKGROUND

The invention relates to a silanised, structurally modified, pyrogenically produced silica, a process for the production thereof and its use.

It is known to use nanoscale particles in transparent coating compositions.

Thus, according to U.S. Pat. No. 6,020,419, pyrogenically produced silicon dioxides, deagglomerated in situ, which have been made hydrophobic with dimethyldichlorosilane (Aerosil® R 972), are used in polyurethane lacquers to improve the scratch resistance of the coatings.

The known silica has the disadvantage that it cannot be produced in powder form without a lacquer binder.

The object therefore existed of developing a silica that does not have these disadvantages.

SUMMARY OF THE INVENTION

The present invention provides silanised, structurally modified, pyrogenically produced silicas, which are characterised by groups fixed on the surface, the groups being dimethylsilyl and/or monomethylsilyl, preferably dimethylsilyl.

In a preferred embodiment of the invention the silicas can have the following physico-chemical characteristics:

| | |
|---|---|
| BET surface area m$^2$/g: | 25-400 |
| Average size of the primary particles nm: | 5-50 |
| pH value: | 3-10 |
| Carbon content %: | 0.1-10 |
| DBP value %: | <200 |

The silica according to the invention can have a tamped density of 100 to 280, preferably 100 to 240 g/l.

A tamped density of more than 280 g/l leads to poorer results in the technical lacquer tests.

Pyrogenic silicas are known from Winnacker-Küchler Chemische Technologie, volume 3 (1983) 4th edition, page 77 and Ullmanns Enzyklopädie der technischen Chemie, 4th edition (1982), volume 21, page 462.

In particular, pyrogenic silicas are produced by flame hydrolysis of vaporisable silicon compounds, such as e.g. $SiCl_4$, or organic silicon compounds, such as trichloromethylsilane.

The invention also provides a process for the production of the silanised, structurally modified, pyrogenically produced silicas according to the invention, which is characterised in that pyrogenically produced silica is treated with dimethyldichlorosilane and/or monomethyltrichlorosilane by a known method, the dimethylsilyl and/or monomethylsilyl groups being fixed on the surface of the pyrogenic silica, and is then structurally modified and optionally post-ground.

In one embodiment of the invention a tempering can take place after the structural modification and/or post-grinding.

The silicas according to the invention can be produced e.g. as follows:

The silicas, which can be produced as described in DE 1 163 784, are then structurally modified by mechanical action and possibly post-ground in a mill. A tempering can possibly take place after the structural modification and/or post-grinding.

The structural modification can take place e.g. with a ball mill or a continuously operating ball mill. The post-grinding can take place e.g. using an air-jet mill or pin mill. The tempering can take place batchwise, e.g. in a drying cupboard, or continuously, e.g. in a fluidised bed. The tempering can take place under protective gas, e.g. nitrogen.

The silicas according to the invention can be incorporated into lacquers, as a result of which these lacquers have increased scratch resistance.

DETAILED DESCRIPTION OF INVENTION

Examples

Production and Physico-chemical Properties of the Silicas
Production of the Comparative Silicas:
The production of the comparative silicas 1, 2 and 3 takes place as described in DE 1 163 784.
Production of the silicas according to the invention:
The silicas, which are produced as described in DE 1 163 784, are then structurally modified by mechanical action and possibly post-ground in a mill. A tempering can possibly take place after the structural modification and/or post-grinding.

The structural modification can take place e.g. with a ball mill or a continuously operating ball mill. The post-grinding can take place e.g. using an air-jet mill or pin mill. The tempering can take place batchwise, e.g. in a drying cupboard, or continuously, e.g. in a fluidised bed. The tempering can take place under protective gas, e.g. nitrogen.

TABLE 1

Overview of the production of the comparative silicas and the silicas according to the invention (Examples)

| Designation | Surface-fixed group | Structural modification | Post-grinding after structural modification | Tempering after post-grinding |
|---|---|---|---|---|
| Comparative silica 1 | Dimethylsilyl | No | — | — |
| Comparative silica 2 | Dimethylsilyl | No | — | — |
| Comparative silica 3 | Dimethylsilyl | No | — | — |
| Silica 1 | Dimethylsilyl | Yes | No | No |
| Silica 2 | Dimethylsilyl | Yes | No | No |
| Silica 3 | Dimethylsilyl | Yes | No | No |
| Silica 4 | Dimethylsilyl | Yes | No | No |
| Silica 5 | Dimethylsilyl | Yes | Yes | No |
| Silica 6 | Dimethylsilyl | Yes | No | No |
| Silica 7 | Dimethylsilyl | Yes | Yes | No |

TABLE 1-continued

Overview of the production of the comparative silicas
and the silicas according to the invention (Examples)

| Designation | Surface-fixed group | Structural modification | Post-grinding after structural modification | Tempering after post-grinding |
|---|---|---|---|---|
| Silica 8 | Dimethylsilyl | Yes | Yes | Yes |
| Silica 9 | Dimethylsilyl | Yes | Yes | Yes |
| Silica 10 | Dimethylsilyl | Yes | Yes | No |
| Silica 11 | Dimethylsilyl | Yes | Yes | No |

TABLE 2

Physico-chemical data of the silicas according to the invention
(Examples) and the comparative silicas

| Designation | Temped density [g/l] | Loss on dying [%] | Loss on ignition [%] | pH value | C content [%] | DHP adsorption [%] | HRT specific surface area [m³/g] |
|---|---|---|---|---|---|---|---|
| Comparative silica 1 | 64 | 0.1 | 0.5 | 4.0 | 0.8 | 243 | 113 |
| Comparative silica 2 | 67 | 0.5 | 0.6 | 4.8 | 1.0 | 256 | 165 |
| Comparative silica 3 | 72 | 0.7 | 1.0 | 4.0 | 1.6 | 255 | 256 |
| Silica 1 | 236 | 0.1 | 0.6 | 4.0 | 0.8 | 127 | 115 |
| Silica 2 | 204 | 0.1 | 0.6 | 3.9 | 0.8 | 137 | 116 |
| Silica 3 | 223 | 0.3 | 0.7 | 4.2 | 1.0 | 160 | 169 |
| Silica 4 | 186 | 0.3 | 0.7 | 4.2 | 1.1 | 152 | 171 |
| Silica 5 | 109 | 0.2 | 0.7 | 4.4 | 1.1 | 159 | 167 |
| Silica 6 | 193 | 1.2 | 0.7 | 5.2 | 1.7 | 157 | 258 |
| Silica 7 | 125 | 0.2 | 0.7 | 4.1 | 0.8 | 130 | 110 |
| Silica 8 | 108 | 0.7 | 1.3 | 5.0 | 1.7 | 156 | 257 |
| Silica 9 | 123 | 0.3 | 0.5 | 4.3 | 1.1 | 157 | 165 |
| Silica 10 | 102 | 0.7 | 1.2 | 6.2 | 1.7 | 164 | 256 |
| Silica 11 | 160 | 0.2 | 0.7 | 4.0 | 0.8 | 132 | 115 |

Example 1

For the investigation of the improvement in scratch resistance, a conventional 2-component polyurethane lacquer was used. The formulation of the lacquer and its production, including application, are summarised below:

Formulation

| | Parts by wt. |
|---|---|
| Millbase | |
| Acrylic copolymer, mod. with synthetic fatty acids, 60% solution | 43.4 |
| Butyl acetate 98% | 17.8 |
| Xylene | 3.9 |
| AEROSIL | 5.0 |
| Σ | 70.7 |
| Lacquer make-up | |
| Xylene | 11.3 |
| Ethoxypropyl acetate | 3.4 |
| Butyl glycol acetate | 1.6 |
| Aliphatic polyisocyanate, approx. 75% in 1-methoxypropyl-2-acetate/xylene 1:1 | 18.6 |
| Σ | 105.0 |

Binder concentration: 40%
AEROSIL calculated on the basis of millbase (solids): 19.2%
AEROSIL calculated on the basis of lacquer (total): 5.0%
AEROSIL calculated on the basis of lacquer (solids): 12.5%

Production and Application of the Lacquers

The binder is mixed with the solvents. Then, for the purpose of predispersion, the AEROSIL is incorporated into this mixture with the high-speed mixer (disk Ø45 mm) and predispersed for 5 min at 2000 rpm. The mixture is dispersed in a laboratory pearl mill for 30 min at 2500 rpm and 60% pump capacity using glass beads (Øapprox. 1 mm). The millbase is tested with a grindometer, 25 μm, in accordance with DIN ISO 1524. It must be smaller than 10 μm.

The conversion of the millbase to lacquer takes place in accordance with the formulation, the components being mixed with a vane agitator at 2000 rpm. The hardener is incorporated in the same way.

After adjusting the lacquers to spray viscosity in accordance with DIN 53411, the lacquers are applied to black lacquered metal sheets, e.g. DT 36 (from Q-Panel), by spray application (coat thickness about 40-50 μm). After spraying, the metal sheets are dried for 24 h at room temperature and then for 2 h in a drying oven at 70° C.

Scratch Tests:

The metal sheets are abraded with a quartz/water slurry (100 g water +1 g Marlon A 350, 0.25%+5 g Sikron F500) using an abrasion and washing resistance tester (Erichsen, brush with hog's bristles). The gloss before and 10 min after the abrading is determined with a reflectometer (20° irradiation angle).

TABLE 3

Summary of the properties of the liquid lacquers relevant in terms of lacquer technology, and of the applied and dried films.

|  | Comparative silica 1 | Silica 1 | Silica 2 | Reference | Comparative silica 2 | Silica 3 | Silica 4 | Reference |
|---|---|---|---|---|---|---|---|---|
| Grindometer value [μm] | <10 | <10 | <10 | / | <10 | <10 | <10 | / |
| Viscosity (millbase) [mPas] | | | | | | | | |
| 6 rpm | 4710 | 421 | 772 | 571 | 4990 | 802 | 772 | 55 |
| 60 rpm | 1120 | 210 | 264 | 225 | 1200 | 279 | 264 | 52 |
| Viscosity (lacquer + hardener) [mPas] | | | | | | | | |
| 6 rpm | 882 | 105 | 210 | 135 | 857 | 235 | 105 | 70 |
| 60 rpm | 239 | 75 | 92 | 79 | 242 | 100 | 26 | 37 |
| Flow | Orange-peel | OK | OK | OK | Orange-peel | OK | OK | OK |
| Scratch resistance | | | | | | | | |
| 20° reflectometer value before scratching | 39.0 | 83.4 | 83.5 | 88.8 | 67.2 | 84.2 | 82.6 | 89.3 |
| Haze before scratching | 430 | 30 | 40 | 3 | 235 | 18 | 10 | 2 |
| 40 strokes with Sikron F 500 residual gloss [%] | / | 83.7 | 82.3 | 56.0 | / | 74.7 | 80.4 | 47.2 |

The silicas 1+2 and 3+4 according to the invention can be used in high concentrations without impairing the appearance of the lacquer surface owing to their substantially lower rheological efficiency compared with comparative silicas 1 and 2. In addition, the silicas according to the invention display a substantial improvement in the scratch resistance of the lacquer surface.

Example 2

In this example the influence of the structural modification was investigated on the basis of a high solids 2-component PU clear lacquer. The formulation of the lacquer and its production, including application and testing, are summarised below:

Formulation

|  | Parts by wt. |
|---|---|
| Millbase | |
| Acrylic copolymer, mod. with synthetic fatty acids, 70% in n-butyl acetate | 61.0 |
| Butyl acetate 98% | 7.3 |
| Methoxypropyl acetate | 1.7 |
| Solvesso 100 | 2.0 |
| Xylene | 2.0 |
| Baysilon OL 17, 10% in xylene (silicone oil) | 0.7 |
| AEROSIL | 5.0 |
| Σ | 79.7 |
| Lacquer make-up (hardener) | |
| Aliphatic polyisocyanate, 90% in n-butyl acetate | 22.3 |

-continued

|  | Parts by wt. |
|---|---|
| Butyl acetate 98% | 2.0 |
| Solvesso 100 | 1.0 |
| Σ | 105.0 |

Binder concentration: 62.8%
Aerosil calculated on the basis of millbase (solids): 11.7%
Aerosil calculated on the basis of lacquer (total): 5.0%
Aerosil calculated on the basis of lacquer (solids): 8.0%

Production and Application of the Lacquers

The binder is mixed with the solvents. Then, for the purpose of predispersion, the AEROSIL is incorporated into this mixture with the high-speed mixer (disk Ø45 mm) and pre-dispersed for 5 min at 2000 rpm. The mixture is dispersed in a laboratory pearl mill for 30 min at 2500 rpm and 60% pump capacity using glass beads (Ø approx. 1 mm). The millbase is tested with a grindometer, 25 μm, in accordance with DIN ISO 1524. It must be smaller than 10 μm.

The conversion of the millbase to lacquer takes place in accordance with the formulation, the components being mixed with a vane agitator at 2000 rpm. The hardener is incorporated in the same way.

After adjusting the lacquers to spray viscosity in accordance with DIN 53411, the lacquers are applied to black lacquered metal sheets, e.g. DT 36 (from Q-Panel), by spray application (coat thickness about 40-50 μm). After spraying, the metal sheets are dried for 24 h at room temperature and then for 2 h in a drying oven at 70° C.

Scratch Tests:

The metal sheets are abraded with a quartz/water slurry (100 g water +1 g Marlon A 350, 0.25%+5 g Sikron F500)

using an abrasion and washing resistance tester (Erichsen, brush with hog's bristles). The gloss before and 10 min after the abrading is determined with a reflectometer (20 ° irradiation angle).

TABLE 4

Summary of the properties of the liquid lacquers relevant in terms of lacquer technology, and of the applied and dried films.

|  | Comparative silica 2 | Silica 3 | Silica 4 | Reference |
|---|---|---|---|---|
| Grindometer value [μm] | <10 | <10 | <10 | / |
| Viscosity (millbase) [mPas] | | | | |
| 6 rpm | 6200 | 1500 | 541 | 140 |
| 60 rpm | 2100 | 900 | 559 | 195 |
| Viscosity (lacquer + hardener) [mPas] | | | | |
| 6 rpm | 3821 | 1041 | 497 | 167 |
| 60 rpm | 1320 | 666 | 446 | 195 |
| Flow | marked orange-peel | OK | OK | OK |
| 20° reflectometer value before scratching | 81.0 | 83.5 | 82.8 | 88.0 |
| Haze | 25 | 5 | 6 | 2 |
| 40 strokes with Sikron F 500 residual gloss [%] | | 94.3 | 93.4 | 82.0 |

The silicas 3+4 according to the invention can be used in high concentrations without impairing the appearance of the lacquer surface owing to their substantially lower rheological efficiency compared with comparative silica 2. In addition, the silicas according to the invention display a substantial improvement in the scratch resistance of the lacquer surface.

Example 3

Direct comparison of the silicas according to the invention with a scratch-resistant lacquer according to DE 198 11 790 A1, in which AEROSIL R 972 is used to improve the scratch resistance.

|  | Prior art 1) | Silicas 2) according to the invention |
|---|---|---|
| Millbase | | |
| Desmophen A 2009/1 | | 190.2 |
| Methoxypropyl acetate: Solvesso 100 1:1 | | 36.8 |
| AEROSIL | | 23.0 |
| Σ | | 250.0 |
| Lacquer make-up | | |
| Desmophen A YEP4-55A, contains AEROSIL R 972 | 96.0 | — |
| Millbase | — | 48.9 |
| Desmophen 2009/1 | — | 24.9 |
| OL 17, 10% in MPA | — | — |
| Modaflow 1% in MPA | — | — |
| MPA: Solvesso 100 1:1 | 11.6 | 33.8 |
| Butyl glycol acetate | 10.5 | 10.5 |
| Byketol OK | 7.5 | 7.5 |
| Byk 141 | 0.8 | 0.8 |

-continued

|  | Prior art 1) | Silicas 2) according to the invention |
|---|---|---|
| Hardener addition | | |
| Desmodur N 3390 | 23.6 | 23.6 |
| Σ | 150.0 | 150.0 |

Production and Application of the Lacquers

1) Comparative silica 1 is incorporated into the binder in accordance with DE 198 11 790 A1 using a jet disperser.
2) The binder is mixed with the solvents. Then, for the purpose of predispersion, the AEROSIL is incorporated into this mixture with the high-speed mixer (disk Ø45 mm) and predispersed for 5 min at 2000 rpm. The mixture is dispersed in a laboratory pearl mill for 30 min at 2500 rpm and 60% pump capacity using glass beads (Øapprox. 1 mm). The millbase is tested with a grindometer, 25 μm, according to DIN ISO 1524. It must be smaller than 10 μm.

The conversion to lacquer of the millbases corresponding to 1) or 2) takes place in accordance with the formulation, the components being mixed at 2000 rpm with a vane agitator. The hardener is incorporated in the same way.

After adjusting the lacquers to spray viscosity in accordance with DIN 53411, the lacquers are applied to black lacquered metal sheets, e.g. DT 36 (from Q-Panel), by spray application (coat thickness about 40-50 μm). After spraying, the metal sheets are dried for 24 h at room temperature and then for 2 h in a drying oven at 70° C.

Scratch Tests:

The metal sheets are abraded with a quartz/water slurry (100 g water+1 g Marlon A 350, 0.25%+5 g Sikron F 500) using an abrasion and washing resistance tester (Erichsen, brush with hog's bristles). The gloss before and 10 min after the abrading is determined with a reflectometer (20 ° irradiation angle).

TABLE 5

Summary of the properties of the liquid lacquers relevant in terms of lacquer technology, and of the applied and dried films.

|  | Prior art | Silica 1 | Silica 4 | Reference |
|---|---|---|---|---|
| Grindometer value [μm] | <10 | <10 | <10 | / |
| Viscosity (millbase) [mPas] | | | | |
| 6 rpm | 58 | 30 | 26 | 30 |
| 60 rpm | 48 | 43 | 33 | 40 |
| Wave scan | | | | |
| long wave | 4.8 | 1.2 | 1.1 | 1.4 |
| short wave | 6.5 | 3.0 | 3.1 | 4.7 |
| 20° reflectometer value before scratching | 89.0 | 90.2 | 89.6 | 90.8 |
| Haze before scratching | 4 | 4 | 3 | 4 |
| 40 strokes with Sikron F 500 Residual gloss [%] | 78.3 | 85.9 | 86.2 | 55.3 |

It is shown that a substantially better improvement in the residual gloss is achieved after a scratch stressing of the lacquer surface by using the silicas according to the invention than with the prior art. In addition, owing to their low rheological efficiency, the silicas according to the invention do not cause an orange-peel effect.

The invention claimed is:

1. Silanised, structurally modified, pyrogenically produced silicas, characterised by groups fixed to the surface, wherein the groups are dimethylsilyl and/or monomethylsilyl, said silicas having a tamped density of 280 g/l or less, said silicas having been structurally modified by being ball milled and being characterised by the following physico-chemical characteristics:

| | |
|---|---|
| BET surface area m$^2$/g: | 25-400 |
| Average size of the primary particles nm: | 5-50 |
| pH value: | 3-10 |
| Carbon content %: | 0.1-10 |
| DBP value %: | <200. |

2. Process for the production of the silanised, structurally modified, pyrogenically produced silica according to claim 1, characterised in that pyrogenically produced silica is treated by a known method with dimethyldichlorosilane and/or monomethyltrichlorosilane, the groups dimethylsilyl and/or monomethylsilyl being fixed on the surface of the pyrogenic silica, and is then structurally modified by ball milling the silica and optionally post-ground.

3. Process for the production of the silanised, structurally modified, pyrogenically produced silica according to claim 2, characterised in that a tempering takes place after the structural modification and/or post-grinding.

4. A method for improving the scratch resistance of lacquers comprising incorporating into the lacquer the silanized, structurally modified, pyrogenically produced silicas defined in claim 1.

5. A silanised, structurally modified, pyrogenically produced and ball milled silica having groups fixed to the surface wherein said groups comprise at least one of dimethylsilyl and monomethylsilyl and wherein said silica has a tamped density of 280 g/l or less, said silica having the following physical chemical properties:

| | |
|---|---|
| BET surface area m$^2$/g: | 25-400 |
| Average size of the primary particles nm: | 5-50 |
| pH value: | 3-10 |
| Carbon content %: | 0.1-10 |
| DBP value %: | <200. |

6. The silanised, structurally modified, pyrogenically produced silica according to claim 5, which has a tamped density of 100 to 280 g/l.

7. A process for the production of a silanised, structurally modified, pyrogenically produced silica of claim 5, comprising:
treating a pyrogenically produced silica with at least one of dimethyldichlorosilane and monomethyltrichlorosilane to thereby fix groups on the surface of the pyrogenic silica, said groups being at least one of dimethylsilyl and monomethylsilyl, structurally modifying said silica by ball milling said silica and optionally post grinding said silica.

8. The process according to claim 7, further comprising tempering after at least one of structurally modifying said silica and post grinding said silica.

9. The process according to claim 8, wherein post grinding is by air-jet mill or pin mill.

10. The process according to claim 8, wherein tempering takes place under protective gas.

11. A lacquer comprising a polyurethane and a silanised silica having been structurally modified by being ball milled and being characterised by the following physico-chemical characteristics:

| | |
|---|---|
| BET surface area m$^2$/g: | 25-400 |
| Average size of the primary particles nm: | 5-50 |
| pH value: | 3-10 |
| Carbon content %: | 0.1-10 |
| DBP value %: | <200. | said silica having a tamped density of 285 g/l or less.

12. A surface coated with the lacquer according to claim 11.

13. The surface according to claim 12, which is metal.

* * * * *